(12) United States Patent
Plusquellic (10) Patent No.: US 10,366,253 B2
(45) Date of Patent: Jul. 30, 2019

(54) RELIABILITY ENHANCEMENT METHODS FOR PHYSICALLY UNCLONABLE FUNCTION BITSTRING GENERATION

(71) Applicant: STC.UNM, Albuquerque, NM (US)

(72) Inventor: James Plusquellic, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 218 days.

(21) Appl. No.: 15/534,116

(22) PCT Filed: Dec. 15, 2015

(86) PCT No.: PCT/US2015/065909
§ 371 (c)(1),
(2) Date: Jun. 8, 2017

(87) PCT Pub. No.: WO2016/100402
PCT Pub. Date: Jun. 23, 2016

(65) Prior Publication Data
US 2017/0364709 A1   Dec. 21, 2017

Related U.S. Application Data (60) Provisional application No. 62/091,985, filed on Dec. 15, 2014, provisional application No. 62/199,685, (Continued)

(51) Int. Cl.
*G06F 21/73* (2013.01)
*G06F 21/70* (2013.01)
(Continued)

(52) U.S. Cl.
CPC .......... *G06F 21/73* (2013.01); *G06F 21/604* (2013.01); *G06F 21/70* (2013.01); *G06F 21/71* (2013.01);
(Continued)

(58) Field of Classification Search
CPC ........ G06F 21/73; G06F 21/604; G06F 21/71; G06F 21/70; G06F 17/18; H04L 9/3278; G09C 1/00
See application file for complete search history.

(56) References Cited

U.S. PATENT DOCUMENTS

| 7,653,849 | B1 * | 1/2010 | Tabatabaei | ..... G01R 31/318508 714/726 |
| 7,779,319 | B1 * | 8/2010 | Tabatabaei | ..... G01R 31/318572 714/724 |

(Continued)

OTHER PUBLICATIONS

James C. Aarestad. A hardware-embedded, Delay-based PUF Engine Designed for Use in Cryptographic and Authentication Applications. Jul. 2013, pp. 1-79. <URL: http://hdl.handle.net/1928/23304> see pp. 30-73.

(Continued)

*Primary Examiner* — Matthew Smithers
(74) *Attorney, Agent, or Firm* — Valauskas Corder LLC (57) ABSTRACT

A Hardware-Embedded Delay Physical Unclonable Function ("HELP PUF") leverages entropy by monitoring path stability and measuring path delays from core logic macros. Reliability and security enhancing techniques for the HELP PUF reduce bit flip errors during regeneration of the bitstring across environmental variations and improve cryptographic strength along with the corresponding difficulty of carrying out model building attacks. A voltage-based enrollment process screens unstable paths on normally synthesized (glitchy) functional units and reduces bit flip errors by carrying out enrollment at multiple supply voltages controlled using on-chip voltage regulators.

22 Claims, 8 Drawing Sheets

Related U.S. Application Data filed on Jul. 31, 2015, provisional application No. 62/204,835, filed on Aug. 13, 2015.

(51) Int. Cl.

| | |
|---|---|
| *G06F 21/60* | (2013.01) |
| *G06F 21/71* | (2013.01) |
| *G09C 1/00* | (2006.01) |
| *H04L 9/32* | (2006.01) |
| *G06F 17/18* | (2006.01) |

(52) U.S. Cl.
CPC .............. *G09C 1/00* (2013.01); *H04L 9/3278* (2013.01); *G06F 17/18* (2013.01)

(56) References Cited

U.S. PATENT DOCUMENTS

| | | | |
|---|---|---|---|
| 9,449,153 B2* | 9/2016 | Guo ........................ | G06F 21/10 |
| 2014/0201851 A1 | 7/2014 | Guo et al. | |
| 2014/0325237 A1* | 10/2014 | Van Der Leest ....... | G06F 21/72 |
| | | | 713/189 |
| 2016/0182045 A1* | 6/2016 | Mai .......................... | G09C 1/00 |
| | | | 326/8 |

OTHER PUBLICATIONS

Aarestad et al. HELP: A Hardware-Embedded Delay PUF. IEEE Design & Test, May 29, 2013, vol. 30, Issue: 2, pp. 17-25, <URL: http://ieeexplore.ieee.org/xpl/articleDetail.jsp?arnumber=6461918> See pp. 18-24.

Ju et al. Bit String Analysis of Physical Unclonable Functions Based on Resistance Variations in Metals and Transistors. 2012 IEEE International Symposium on Hardware-Oriented Security and Trust (HOST), Jun. 2012, pp. 13-20 <URL: http://ieeexplore.ieee.org/xpl/articleDetail.jsp?arnumber=6224312> See pp. 15-20.

Saquib et al., An ASIC Implementation of a Hardware-Embedded Physical Unclonable Function. IET Computers & Digital Techniques, vol. 8, Issue 6, Nov. 2014, pp. 288-299.

\* cited by examiner

Trace #: Input trans-output val
0: 000-0->001-0->011-1->111-1
1: 000-0->001-0->101-1->111-1
2: 000-0->010-0->011-1->111-1
3: 000-0->010-0->110-1->111-1
4: 000-0->100-1->101-1->111-1
5: 000-0->100-1->110-1->111-1

RELIABILITY ENHANCEMENT METHODS FOR PHYSICALLY UNCLONABLE FUNCTION BITSTRING GENERATION

This application claims the benefit of U.S. Provisional Application No. 62/091,985 filed Dec. 15, 2014, U.S. Provisional Application No. 62/199,685 filed Jul. 31, 2015, and U.S. Provisional Application No. 62/204,835 filed Aug. 13, 2015, each incorporated by reference in its entirety.

GOVERNMENT SUPPORT

This invention was made with government support under grants CNS-1018748 awarded by National Science Foundation (NSF). The government has certain rights in the invention.

FIELD OF THE INVENTION

The invention relates generally to protection of electrical circuitry used in hardware components, and more specifically, to voltage-based enrollment for Physical Unclonable Functions ("PUFs").

BACKGROUND OF THE INVENTION

An integrated circuit ("IC"), also known as a chip or a microchip, is a miniaturized electronic circuit used in electronic equipment such as computer, telephone, and digital applications. An IC is typically formed of semiconductor devices, such as silicon and germanium, as well as passive components such as capacitors, resistors, and diodes. Usually, an IC is manufactured on a thin substrate of semiconductor material. In recent years, cost in manufacturing of ICs, per transistor, has decreased. However, while lower cost increases the availability of manufacturing, ICs must be protected from threats such as cloning or copying as well as protected against misappropriation and unauthorized use. Threats may allow unauthorized access to encrypted data, replication of IC design including unauthorized use of intellectual property ("IP") and hardware piracy or the illegal manufacturing of the ICs. Threats of cloning, misappropriation and unauthorized use of a security key are a problem, particularly in computer applications that use a security key in authentication protocols.

Many computer-based hardware security schemes exist to protect ICs from cloning and unauthorized use. These security schemes depend on accessibility to a security key or signature, such as a unique unclonable identifier derived from each IC. Security keys define the basis of computer-based hardware security mechanisms implemented at high levels of hardware security such as those mechanisms that perform encryption of data communication channels, or provide IP theft protection in computer-based logic devices including Field-Programmable Gate Arrays ("FPGAs").

Conventional security keys are defined using digital data stored, for example, in a flash memory or read only memory ("ROM") on the IC. From a security perspective, it is desirable that access to the security key is restricted to hardware circuits formed on the IC. Unfortunately, security keys stored using these conventional technologies are subject to invasive physical attacks which can allow an adversary to learn the secret key. If the secret key is learned by an adversary, then clones ICs can be created and security protocols can be compromised.

Random bitstrings may form the basis for encryption, identification, authentication, and feature activation in hardware security. In current technologies, keying material for encryption may be stored as digital bitstrings in non-volatile memory on FPGAs and Application Specific Integrated Circuit ("ASICs"). However, secrets stored this way may not be secure against a determined adversary, who can use probing attacks to steal the secret.

Physical Unclonable Functions ("PUFs") may be used as alternative to storing digital bitstrings in non-volatile memory. A PUF refers to an IC hardware primitive that leverages entropy introduced by manufacturing variations to produce bitstrings, and may incorporate an on-chip infrastructure for measuring and digitizing the corresponding variations. PUFs may measure and digitize the natural variations that occur in path delays, leakage current, or SRAM power-up patterns, to produce a random bitstring.

Various techniques have been proposed to protect ICs using PUF implementations. Challenge-based IC authentication is one example. With challenge-based IC authentication, a secret key is embedded in the IC that enables the IC to generate a unique response to a challenge, which is valid only for that challenge. Thus, the key remains secret and the mechanism performing authentication is resistant to spoofing. Remote activation schemes are another example. Remote activation schemes enable IC designers to lock each IC at start-up and then enable it remotely, providing intellectual property protection and hardware metering. States are added to the finite state machine ("FSM") of a design and control signals are added which are a function of the secret key. Therefore, the hardware locks up until receipt of a specific activation code. Other examples of PUF implementations include mismatched delay-lines, static random access memory ("SRAM") power-on patterns, metal-oxide semiconductor ("MOS") device mismatches and input dependent leakage patterns. However, each of these techniques has vulnerabilities related to misappropriation, cloning or unauthorized use of a security key for an IC.

Authentication is the process between a prover—e.g., a hardware token or smart card—and a verifier—a secure server or bank—that confirms identities using corroborative evidence of one or both parties. With the network of physical objects embedded with electronics, software, sensors, and network connectivity enabling the collection and exchange of data—referred to as the Internet-of-things ("IoT")—there are a growing number of applications in which the hardware token is resource-constrained, and therefore, novel authentication techniques are required that are low in cost, energy and area overhead.

Conventional methods of authentication which use area-heavy cryptographic primitives and non-volatile memory ("NVM") are less attractive for these types of evolving embedded applications. However, PUFs are hardware security and trust primitives that can address issues related to low cost because they eliminate (in most proposed authentication protocols) the need for NVM.

PUFs may be classified as a "strong PUF" or a "weak PUF". "Strong PUFs" may reduce area and energy overheads by reducing the number and type of cryptographic primitives and operations whereas area overhead restricts the physical size of the entropy source in a "weak PUF".

Most proposed "weak PUF" architectures require the insertion of a dedicated array of identically-designed test structures to serve as the entropy source in which the area overhead restricts the physical size of the entropy source. Although "weak PUFs" can be used for authentication, they require the insertion of obfuscation functions, e.g., cryptographic hash, encryption and XOR functions, to protect their limited amount entropy against adversarial interface attacks designed to machine learn the secrets.

On the other hand, most "strong PUFs" circumvent the limited amount of entropy within specialized test structures by leveraging the entropy available in existing on-chip resources. A "strong PUF" is able to produce a very large number of challenge-response-pairs ("CRPs") for authentication operations.

As mentioned above, a PUF extracts entropy (randomness) from variations in the physical and electrical properties of ICs, which are unique to each IC, as a means of generating digital secrets (bitstrings). The bitstrings can serve the role of uniquely identifying the hardware tokens for authentication applications. The bitstrings are generated on-the-fly, thereby eliminating the need to store digital copies of them in NVM, and are (ideally) reproducible under a range of environmental variations. The ability to control the precise generation time of the secret bitstring and the sensitivity of the PUF entropy source to invasive probing attacks (which act to invalidate it) are additional attributes that make them attractive for authentication in resource-constrained hardware tokens. However, there is a demand to improve the reliability and security of ICs, particularly mitigating the vulnerability of security keys to threats including cloning, impersonation, misappropriation and unauthorized use. The invention satisfies this demand.

SUMMARY OF THE INVENTION

With the demand to improve the reliability and security of ICs, particularly mitigating the vulnerability of security keys to threats including cloning, impersonation, misappropriation and unauthorized use, a Hardware-Embedded Delay Physical Unclonable Function ("HELP PUF") leverages path delay variations that occur in the core logic macros of a chip to create random bitstrings as discussed in further detail in International Application PCT/US2014/053276 filed Aug. 28, 2014, incorporated by reference in its entirety.

The HELP PUF is a "strong PUF" based on its generation of bitstrings from delay variations within existing functional units with the complexity of the functional unit's interconnectivity adding significantly to the size of the entropy source. The bitstrings generated by PUFs may be used for numerous applications including, for example, encrypting communications, implementing anti-counterfeiting techniques, detecting malicious system alterations in the field, carrying out supply chain authentication, activating vendor specific features on ICs, etc.

The process of preparing a hardware token for authentication operations is known as initialization or enrollment. During initialization, a secure server randomly selects a small subset of challenges that are applied to the PUF to generate a corresponding set of responses. This set of CRPs is then recorded by the server in a secure database, which is then later used for authenticating the fielded token. The number of stored CRPs for each token can be small because the large CRPs space along with the secrecy of the selected subset makes it very difficult for adversaries to build a clone to impersonate the token.

The invention is directed to reliability and security enhancing techniques for the HELP PUF. According to the invention, bit flip errors are reduced during regeneration of the bitstring across environmental variations. In addition, cryptographic strength is improved along with the corresponding difficulty of carrying out model building attacks.

According to one embodiment of the invention, the reliability and security enhancing technique is directed to a voltage-based enrollment process. The voltage-based enrollment process screens unstable paths on normally synthesized (glitchy) functional units and reduces bit flip errors by carrying out enrollment at multiple supply voltages controlled using on-chip voltage regulators.

According to another embodiment of the invention, a margin technique improves reliability significantly. Implementing a logic style referred to as wave-differential dynamic logic ("WDDL") eliminates glitches in the functional unit and facilitates the comparison of reliability and security with a normally synthesized functional unit. Although the invention is discussed using WDDL to eliminate glitches, any technique that eliminates glitches is contemplated.

Another embodiment of the invention is directed to an extended version of a WDDL-based standard cell library. Use of a WDDL logic style reduces area overhead of glitch-free functional units. Security of the HELP PUF is improved by using a technique called functional diversity, where different subsets of the library are used to build different implementations of the functional unit.

According to another embodiment of the invention, entropy is quantified using specialized CAD-based circuit analysis tools. These tools are applied to the glitch-free version of the functional unit as a means of quantifying the total amount of entropy represented by the paths in the functional units.

The details of one or more examples are set forth in the accompanying drawings and the description below. Other features, objects, and advantages will be apparent from the description and drawings, and from the claims.

BRIEF DESCRIPTION OF THE DRAWINGS

The preferred embodiments of the invention will be described in conjunction with the appended drawing provided to illustrate and not to the limit the invention, where like designations denote like elements, and in which.

DETAILED DESCRIPTION OF PREFERRED EMBODIMENTS

As described herein, the HELP PUF is a "strong PUF" suitable for hardware-based authentication. The security properties reduce protocol complexity, particularly on the side of the resource-constrained in-field hardware tokens such as credit-cards, embedded sensors and medical implants. A simple PUF-based authentication scheme is proposed that minimizes the number of cryptographic functions required on the token, reducing both area and energy overhead.

Figure 1:
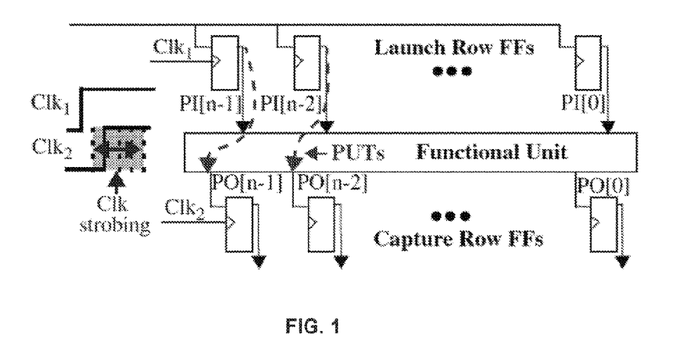
FIG. 1 is a block diagram of a clock strobing technique for measuring path delays according to an embodiment of the invention.

The source of entropy (randomness) for HELP PUF is the manufacturing variations that occur in the delays of paths that define the functional unit. Path delays are measured using a clock strobing technique as illustrated in FIG. 1. The functional unit can be an adder, multiplier or a cryptographic primitive. The 'Launch Row FFs' and 'Capture Row FFs' are also components of the functional unit. The only modification required for the integration of HELP PUF into the functional unit involves the use of a second clock, labeled $Clk_2$, which drives the Capture Row FFs.

The delays of a set of paths—labeled as PUTs for paths-under-test in FIG. 1—are measured by applying a series of launch-capture clocking events, called clock strobing, using $Clk_1$ and $Clk_2$ as shown in FIG. 1. The phase shift between $Clk_1$ and $Clk_2$ is increased incrementally across the sequence of launch-capture tests. The digitally selected value of the phase shift between the two clocks is referred to as the launch-capture interval ("LCI").

The smallest LCI that allows the propagating edge along a path starting from a Launch FF to be captured in a capture FF is used as the digitized timing value for the path. The digital timing values for a large number of paths can be obtained by repeating the clock strobing operation for a set of binary input vectors applied to the primary inputs ("PIs") from the Launch FFs.

The ability to create a phase shifted clock is a common feature of on-chip digital clock managers ("DCMs"). For low-cost components that do not include a DCM, this phase shift capability can be implemented with a small area overhead using a multi-tapped delay chain. For purposes of this application, the LCI path timing value is referred to as a "PUFNum" or "PN".

The signed difference of two randomly selected PNs is referred to as a "PNDiff".

Figure 2:
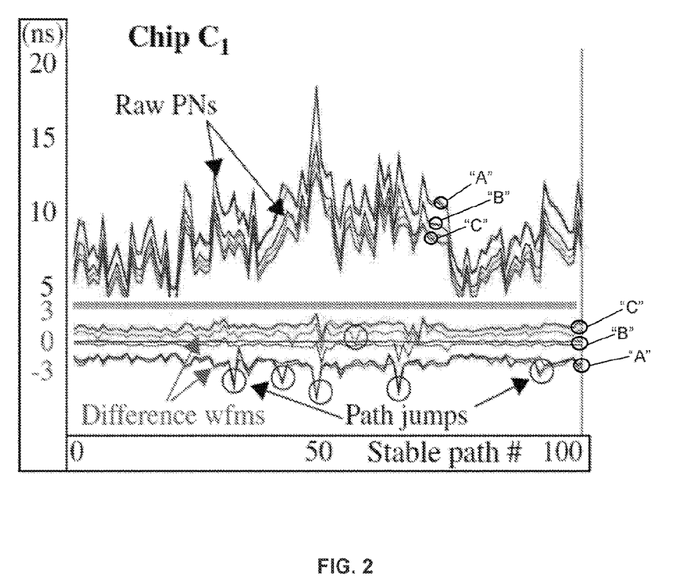
FIG. 2 is a graph of delays (y-axis) associated with stable paths (x-axis) according to an embodiment of the invention.

According to one embodiment of the invention, 10,000 stable paths are measured during enrollment at 25° C., 1.00V. The paths tested during enrollment are stored in a file and replayed during regeneration at 9 temperature-voltage ("TV") corners. The TV corners are all combinations of the $V_{DD}$ supply voltages (−5%, nominal, +5%) and temperatures (0° C., 25° C., 85° C.). The FPA sweep range is 200 to 1020 in steps of size 2, so each path is retested using clock strobing a maximum of (1020-200)/2=410 times. FIG. 2 illustrates a graph of delays of the first 100 stable paths for chip $C_1$ at each of the TV corners. The waveforms denoted by "A" represent the delays at the supply voltage $V_{DD}=0.95V$ (or −5%). The waveforms denoted by "B" represent the delays at the supply voltage $V_{DD}=1.00V$ (nominal) and the waveforms denoted by "C" represent the delays at the supply voltage $V_{DD}=1.05V$ (or +5%). The 3 superimposed waveforms of each "A", "B", "C" represents the delays at each of the 3 temperatures. It is clear that $V_{DD}$ variations are much more significant than temperature variations. The net effect of TV variations is shown by the waveforms along the bottom of FIG. 2, which are computed as the point-wise difference between the delays measured during enrollment and those measured at each of the 9 TV corners. In the absence of TV variations, the difference waveform should be 0, as shown for the case which subtracts the enrollment waveform at 25° C., 1.00V from the regeneration waveform at the same TV corner. The average constant off-set in delay from 0 depicted for most of the paths in the difference waveforms are associated with robust testable paths. Robust test-able paths are, by definition, paths that remain stable under any TV corner because all side inputs of gates along the sensitized path remain stable, i.e., they do not glitch.

In contrast, paths whose delays change dramatically are associated with non-robust testable paths where side inputs of gates along the sensitized path change momentarily. In cases where a change on a side input changes slightly before the change on the sensitized path input, it is possible that the edge propagating along the sensitized path is momentarily delayed by the side input glitch. This in turn introduces an additional change or jump in delay for this path (beyond the change introduced by the TV corner conditions). These cases are most noticeable by large changes in delays that occur ONLY at one or a small number of TV corners (several cases are circled in FIG. 2).

Given that bitstring generation always compares path delays with other path delays on the same chip, any type of systematic change in both delays allows the same bit value to be produced. However, if a large delay change occurs in one path because of a jump, then a bit flip can (and usually will) occur. Identifying which paths are likely to jump can reduce or eliminate uncertainly regarding the reliable regeneration of the bitstring.

According to the invention, a voltage-based enrollment scheme is designed to find more of these paths during enrollment as a means of improving the probability that the bitstring is regenerated without error.

According to one embodiment, a bit is generated under the universal No-Modulus Difference ("UNMD") method subject to authentication using voltage-based enrollment. Although the bit is generated under UNMD, any bit generation method is contemplated, for example, Dual PN Count (DPNC).

A bit is generated under the UNMD method by computing the signed difference between a pair of path delays, using the digital PN representation. As mentioned above, the LCI path timing value is referred to as a "PUFNum" or "PN" and the signed difference of two randomly selected PNs is referred to as a "PNDiff". The negative difference generates a '0' bit while a positive difference produces a '1' bit. In order to improve the chances that regeneration of the bitstring will be error-free, a threshold is used to choose PN pairings whose differences are sufficiently large to survive noise and drift introduced by changes in temperature-voltage ("TV") conditions.

Figures 3A, 3B:
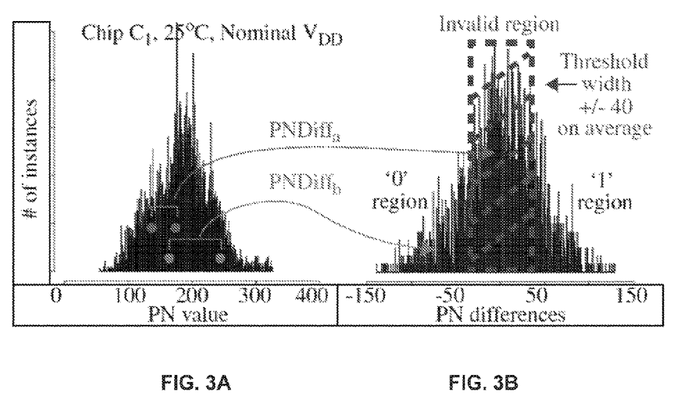
FIG. 3A is a distribution graph of the LCI path timing value ("PN") at enrollment according to an embodiment of the invention.
FIG. 3B is a distribution graph of delay difference from selected pairs of PNs as shown in FIG. 3A according to an embodiment of the invention.

As an example, the delay distribution for chip $C_1$ under nominal conditions is shown in FIG. 3A along with 2 example pairings labeled $PNDiff_a$ and $PNDiff_b$. The magnitude of $PNDiff_a$ places it in the 'invalid region' in the center of the PN difference distribution shown in FIG. 3B and therefore the PNs in this pairing are marked invalid during enrollment.

In contrast, the magnitude of $PNDiff_b$ is larger and appears in the '0' region of FIG. 3B. A public data bitstring records which PNs participate in bitstring generation (marked with a '1') and which do not (marked with a '0'). This criteria adds to that given earlier for unstable paths. Therefore, every tested path has a corresponding public data bit which is marked with a '1' if 1) the path produces a single transition (is stable) and 2) the PN difference of the pairing is greater than the threshold.

A relatively large threshold is required in order to ensure error-free regeneration, which in turn reduces the number of bits available for the bitstring, using certain methods to eliminate all bit flip errors in all chips under all TV conditions.

For example, FIG. 3B shows the threshold is approximately +/−40 on average, which translates to 40*36 ps=1.4 ns. Although this allows the HELP PUF to leverage within-die variations, the number of path pairings that are eliminated is fairly large. Many of these pairings remain stable—i.e., do not introduce bit flip errors—across TV corners and therefore, there is a relatively large 'yield loss' in bits associated with thresholding.

Voltage Based Enrollment ("VBE") is designed to address this yield loss issue by allowing the threshold to be reduced. Advantageously, VBE increases the size of the bitstring by 67% on average using the same set of PNs. According to VBE, enrollment is carried out at multiple supply voltages. According to one embodiment of the invention 3 supply voltages are used, but any number is contemplated.

Unlike temperature, supply voltage can be quickly changed, e.g., millisecond range if the DV is small; however, small changes produce large changes in the MUT delays. In general, VBE leverages the high sensitivity of path delays to supply voltage as a means of better predicting which path delays will 'jump' at other TV corners.

Figure 4:
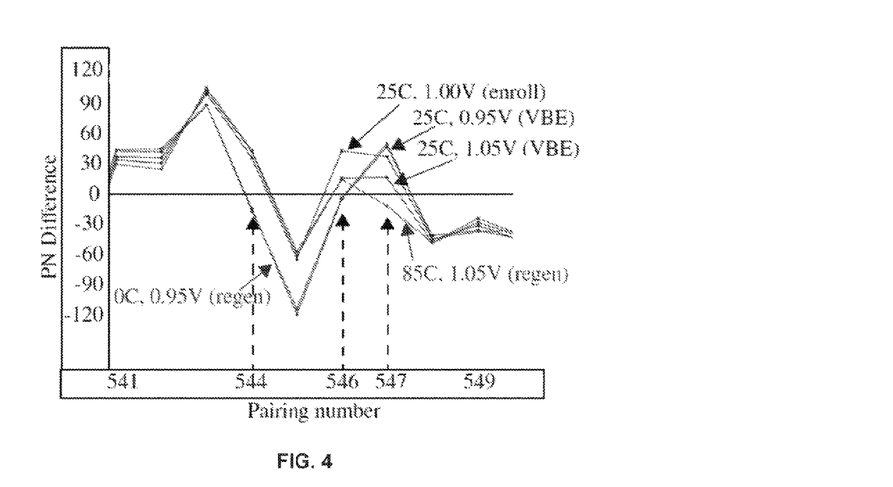
FIG. 4 is a graph illustrating a segment of PNs differences illustrating the voltage based enrollment ("VBE") technique according to an embodiment of the invention.

As shown in FIG. 4, a subset of the path pairings are plotted along the x-axis against their corresponding PN differences on the y-axis, which are computed by subtracting pairs of PNs. FIG. 4 illustrates one enrollment curve and two VBE curves. Only two of the regen curves of the six are shown (the other 4 curves are consistent with the enrollment curve and have been omitted to reduce clutter in the graph). The pairing numbers 544, 546 and 547 illustrate cases where bit flips occur. Bit flips occur whenever the points across the set of curves appear on both sides of the 0 line. The different signs associated with the PN differences change the generated bit from '0' to '1' or vice versa. Since these pairings may introduce bit flips during regeneration, VBE uses the two additional voltage corners as a means of identifying these problematic pairings and excluding them from the bit generation process.

According to a first variant of VBE, the bitstring is computed 3 times at each of the three voltages—0.95V, 1.00V, 1.05V—and looks for inconsistencies in the 3 bits in each bit position. It should be noted that the VBE bitstrings are generated using the regeneration process, which uses the public data from enrollment to determine which paths to test. In cases where a bit in a given bit position differs from the other 2, the enrollment bitstring and public data are updated to eliminate this bit and paths. The bits and pairings labeled 544 and 546 in FIG. 4 are removed because the bits produced in the 25° C., 0.95V VBE bitstring are different than the enrollment bits. Unfortunately, the bit flip at pairing 547 is not detected using this method. However, the smaller PN difference associated with the data point from the 25° C., 1.05V VBE curve can be used as a predictor in this case.

According to a second variant of VBE, a jump margin parameter is used to deal with the bit flips missed by the first variant discussed above. In particular, the second variant removes pairings in cases where there is no bit flip but one or both of the VBE data points is less than the jump margin. For example, setting the jump margin to 30 would detect and eliminate the bit flip error introduced by pairing 547.

Figure 5:
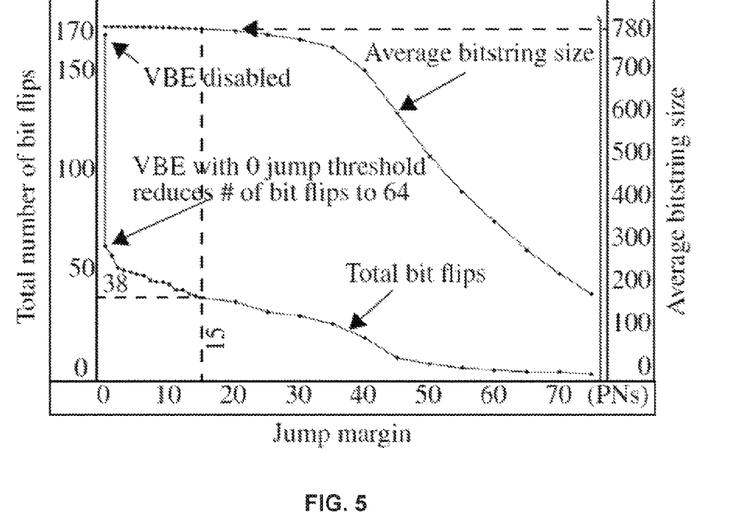
FIG. 5 is a graph illustrating the trade-off between jump margin and average bitstring size according to an embodiment of the invention.

The curves in FIG. 5 show the effectiveness of VBE using a variety of jump margin values, which are plotted along the x-axis. The left y-axis counts the total number of bit flips that occur across all chips and TV corners. When VBE is disabled, the number of bit flips is 170. Enabling VBE but using a jump margin of 0 reduces the number to 64. Therefore, variant 1 of VBE reduces the number of bit flips by nearly 62%. The impact of variant 2 is shown by the remaining components of the curve. For example, using a jump margin of 15 reduces the number of bit flips to 38. The average bitstring size is also plotted along the right y-axis for each of the jump margins along the x-axis. The average size of the bitstring is given as 780. Very little change in size occurs until the jump margin increases to 20, with large reductions beginning at a jump margin of 40 and above. This clearly shows the benefit of VBE in reducing the number of bit flips while also reducing the yield loss bit penalty.

Since the number of bit flips is not zero at jump margins less than 20, VBE must be combined with certain generation methods to achieve error-free regeneration. However, the smaller number of bit flips allows the threshold to be reduced. For example, using a jump margin of 15, while retaining error-free regeneration for all chips at all TV corners, reduces the threshold to PN=23 (approximately 820 ps).

The generation of 10,000 paths required the testing of approximately 30,000 paths. Each tested path requires 1 bit of public data storage so public data size is approximately 3.75 KB. Our proposed technique that eliminates retested paths reduces the number of valid paths from 10,000 to 5,000. The bitstring generation algorithm creates path pairings from consecutive PNs in the sequence of 5,000 for each chip. Therefore, we can generate a maximum of 2,500 bits using 5,000 PNs. With the threshold set to 820 ps as described above, the number of valid PN pairings (or bits) reduces to approximately 1,300. TMR constructs 3 copies of the bitstring but requires 5 copies on average to achieve this. Therefore, the final average bitstring size is 1,300/5 ~=259 bits.

Figure 6:
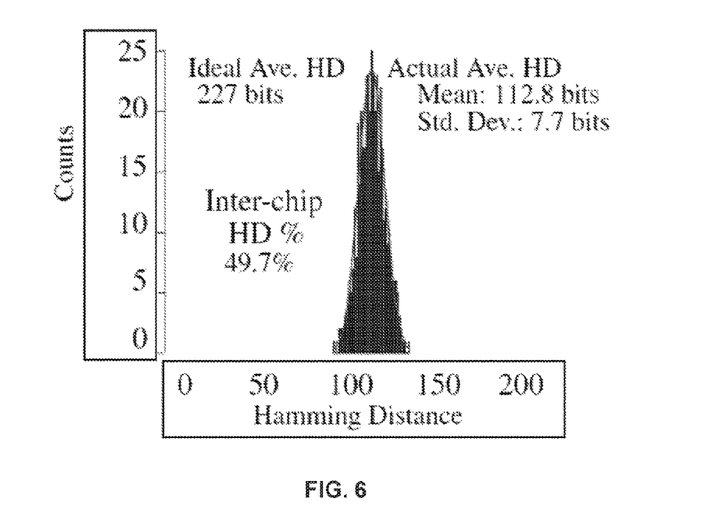
FIG. 6 is a histogram of individual inter-chip hamming distance ("HD") according to an embodiment of the invention.

Using the smallest bitstring size of 227 bits, intra-chip hamming distance (HD) is zero, i.e., there are no bit flips in any of the 30 chips at any of the 9 TV corners. The inter-chip HD is 49.7%, which is close to the ideal value of 50%. FIG. 6 illustrates a histogram of the individual HDs. With 30 chips, HDs are computed from the 30*29/2=435 pairing of chip bitstrings.

According to the invention, reliability and entropy enhancements are provided by glitch-free functional units. According to an embodiment of the invention, the substitution box ("SBOX") component is used as the functional unit. In cryptography, an SBOX is a basic component of symmetric key algorithms which performs substitution. In general, an SBOX takes some number of input bits, m, and transforms them into some number of output bits, n, where n is not necessarily equal to m.

The SBOX component is implemented in two ways referred to as "standard design" or "WDDL design". The "standard design" is without any type of special logic style or constraints, i.e., normally synthesized. The "WDDL design" is without glitches using wave-differential dynamic logic. Although the invention is discussed using WDDL to eliminate glitches, any technique that eliminates glitches is contemplated. In order to determine trade-off of the two logic styles on randomness, uniqueness and reliability, inter-chip hammering distance ("HD") is evaluated.

Temperature and voltage variations cause undesirable changes in delay, most of which can be removed by applying a TV compensation process. TV compensation is carried out by computing the mean (offset) and range (multiplier) from a set of PNDiffs for each chip and for each TV corner separately. The offset and multiplier computed during enrollment are used with the offset and multiplier computed at each TV corner to compensate the PNDiffs generated at the TV corners using Equation 1:

$$zval_i = \frac{(PNDiff_{TVx} - \mu_{TVx})}{rng_{TVx}}$$

$$PNDiffs_{TVComp} = zval_i rng_{TVEnroll} + \mu_{TVEnroll}$$

Here, $zval_i$ represents a standardized PNDiff after subtracting the mean and dividing by the range computed using a set of PNDiffs produced at the TV corner, $TV_x$, for a specific chip. The individual $zval_i$ are then transformed using the mean and range computed earlier for the same chip during enrollment, i.e., at TVEnroll. The PNDiffs generated during enrollment are used as the "reference". This linear transformation is very effective at eliminating the shifting and scaling that occurs to path delays at different TV corners.

A second bit generation scheme which is based on a modulus scheme is more effective at leveraging entropy in glitch-free functional units. The modulus scheme uses the signed difference in two path delays (PNDiff) as a means of both hardening the algorithm against model building and increasing the diversity in the PUF responses. A ModPNDiff is defined by computing a signed difference between two arbitrary selected PNs, and then applying a modulus. The modulus is necessary because the paths in the FU vary in length, for example, short paths consist of 1 LUT while the longest paths consist of 13 LUTs, which is captured in the PNDiffs. The modulus removes the 'path length' bias while fully preserving the smaller within-die delay variations.

Figure 7:
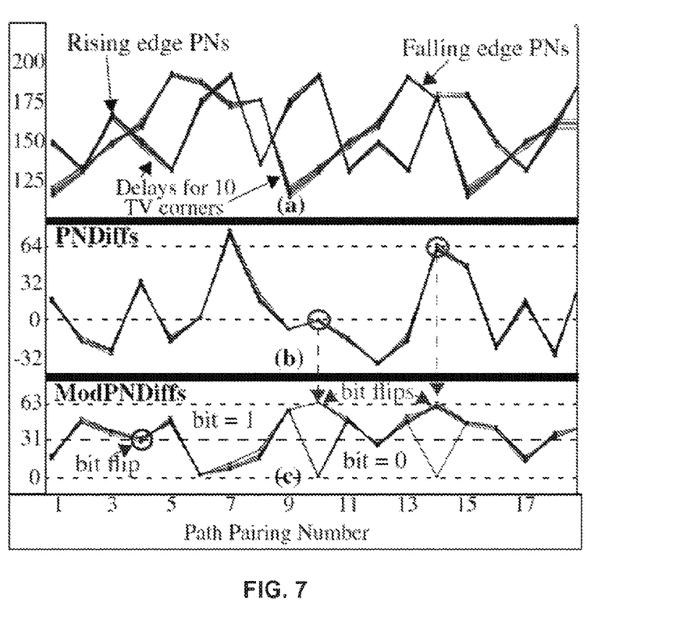
FIG. 7 is a graph illustrating PNs, PNDiffs, ModPNDiffs according to an embodiment of the invention.

As an example, the top of FIG. 7 shows two sets of wave-forms labeled 'Rising edge PNs' and 'Falling edge PNs'. The points in the waveforms represents the delay values (PNs) measured from a set of paths in chip $C_1$ in the SBOX functional unit. Each group of waveforms with similar shape represent the PNs measured at each of the 10 TV corners after a TV compensation method is applied (a process identical to the TV compensation applied to the PNDiffs described above). The vertical spread in the 10 points represent uncompensated TV noise. The waveforms shown in the middle of FIG. 7 represent the PNDiffs computed from randomized pairings of rising and falling edge PNs as shown in the top of FIG. 7. Although only chip $C_1$ data is shown, the shape of the difference waveforms is similar for other chips because of the path length bias. The ModPNDiffs shown at the bottom of FIG. 7 are the result of applying a modulus of 64 to the PNDiffs computed from randomized pairings of rising and falling edge PNs shown in the middle of FIG. 7. The modulus effectively 'wraps' all differences into the range of 0 to 63 and reduces and/or eliminates the bias. The bit generation algorithm assigns ModPNDiffs in the range from 0 to 31 as '0' while those in the range of 32 to 63 are assigned '1'.

As can be seen in the middle of FIG. 7, the circles on points 10 and 14 show bit flips. Bit flips occur when some, but not all, of the 10 points in each group cross over one of the boundaries given by 0 or 63. An additional bit flip is shown by the circle for point 4 at the bottom of FIG. 7, where the points cross over the boundary between '0' and '1' The close grouping of the 10 points makes it is possible to apply a predictive screening process that avoids most/all of these bit flips as discussed more fully below. Moreover, the modulus parameter can be used to remove bias as described but it is also useful for increasing the input-output space of the HELP PUF, discussed in more detail below.

According to the "WDDL design", the SBOX component is implemented without glitches using wave-differential dynamic logic ("WDDL") as a means of measuring entropy introduced by global and within-die delay variations, and as a means of improving the reliability of the HELP PUF. WDDL eliminates functional and logic hazards by imposing stimulus constraints and restricting the implementation to use only positive gates. WDDL is proposed as a mechanism to harden a design unit such as AES against side-channel attacks, and therefore, also attempts to eliminate information in the power curves. The benefit of WDDL is that it is simple to implement and provides a nice test bed for evaluation of glitch-free logic implementation.

The details of the process flow for creating a WDDL version of the functional unit are provided below. For simplicity, it only needs to be known that the WDDL version of the netlist contains the original network plus a complementary network constructed with a set of dual gates. The 8 primary inputs of the SBOX are replicated and complemented to drive the complementary network. The operation of WDDL consists of two phases: a precharge phase and an evaluate phase. The precharge phase includes that all primary inputs (including the complementary inputs) are driven with '0'. This forces '0's on the inputs and output of all gates throughout the circuit. The evaluate phase applies the true and complementary values to the 8 true and complementary primary inputs, respectively, and causes a set of rising transitions to propagate through the circuit. For the SBOX implementation, half of the true outputs and half of the complementary outputs transition on aver-age during evaluate. Therefore, for each of the 256 possible input transitions, i.e., from 0000000->xxxxxxxx, 8 PNs are obtained to produce a total of 2048 PNs. Another 2048 are obtained for the precharge phase, i.e., from xxxxxxxx->00000000, so a total of 4096 PNs are produced, from which a set of 2048 PNDiffs can be uniquely constructed.

Figure 8:
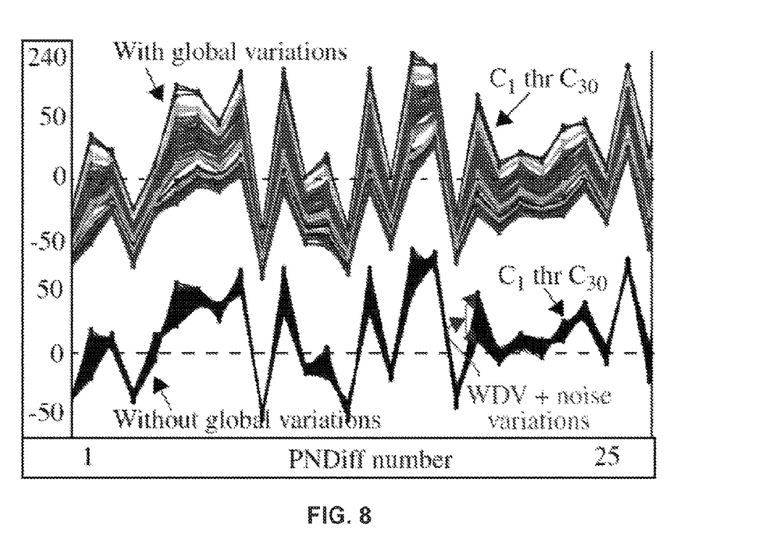
FIG. 8 is a graph illustrating temperature-voltage ("TV") compensated PNDiffs with and without global variations according to an embodiment of the invention.

Running experiments on 30 chips at temperatures 0° C., 25° C. and 85° C. and supply voltages 0.95 V, 1.00 V and 1.05 V. A 25 point sample of the 2048 PNDiffs measured from the 30 chips at the TV corners is shown in FIG. 8. The PNDiffs are computed by selecting a unique random pair of PNs, one from the rising paths and one from the falling paths (see top of FIG. 7). Groups of waveforms have been TV compensated as described above (see Equation 1), using the enrollment values for each chip as the "reference". The vertical offsets between the waveform groups are caused by global (chip-wide) variations, i.e., variations in the overall performance characteristics of the chips. Although global variations can be leveraged as a source of entropy, similar to within-die variations, there are drawbacks to depending on it.

To illustrate this problem, the waveforms shown along the bottom of FIG. 8 are again from the 30 chips but are TV compensated using a special process in which the enrollment data from chip $C_1$ is used as the reference for all chips. This effectively eliminates the global variations and leaves only measurement noise, uncompensated TV noise and within-die variations (WDV) (see FIG. 8). In a large population of chips, it is highly likely that sets of chips will have the same level of global variations, so this graph illustrates this case, where only within-die variations can be leveraged as a source of entropy.

Figure 9:
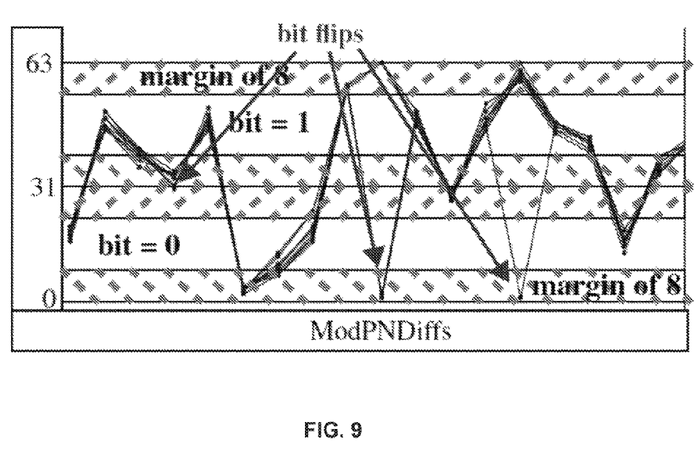
FIG. 9 is a graph illustrating a margin technique according to an embodiment of the invention.

The magnitude of the noise sources is reflected in the width of the band of waveforms shown along the top of FIG. 8. Measurement noise (with 16 sample averaging) is approximately 1 PN on average (approximately 18 ps), so the majority of the variation is introduced by uncompensated TV noise. The mean value of variation, computed as the mean of the 3σ values of the 10 TV compensated PNDiffs, that remains in the waveforms is on average approximately +/−2.5 LCIs or 45 ps above or below the enrollment value, and the worst case value is less than +1-8 LCIs or 145 ps. This number is important since it represents the amount of entropy that is lost, i.e., within-die variations less than this LCI value are more difficult to leverage. Within-die variations are reflected in the change in shape of the waveform groups for each chip. The magnitude of the variations introduced by within-die variations is, on average, approximately 4× larger (20 LCIs) than the average variation introduced by TV noise (5 LCIs), i.e., 360 ps vs 90 ps, respectively. According to the invention, reliability is improved by using a margin technique. The margin technique identifies PNDiffs during enrollment that have the highest probability of introducing bit flips. The PN modulus graph shown along the bottom of FIG. 7 is replicated in FIG. 9 to serve as an illustration. FIG. 9 shows 3 cases where bit flips occur. All of these data points are close to the lines that represent the boundaries between '0' and '1', i.e, 0, 31 and 63. The margin technique classifies an enrollment PNDiff as 'invalid' if it falls within a small region (a margin) around these boundaries. The margin is set ideally to the worst case TV noise level for best results (a margin of 8 is used in FIG. 9), but can be tuned according to the level of tolerance that is needed. A helper data bitstring is constructed during enrollment that records the valid status of each ModPNDiff data point. During regeneration, the helper data is used to filter and discard the 'weak' bits in the response.

Specific combinations of the PN modulus and margin also allow the discarded bits to be used in the response bitstring. The example shown in FIG. 9 illustrates one valid combination where the PN modulus is 64 and the margins are set to 8. In this example, it is possible to use the complement of the helper data to generate a second response bitstring. The second response bitstring uses the same set of PNDiffs but first adds an offset equal to ¼ of the PNMod (16 in the example) before applying the modulus operation, which effectively shifts the distribution and converts all of the previous 'weak' bits into 'strong' bits (and vice versa). This technique allows all data points to be used in the response bitstring and reduces the overhead penalty of the helper data by making the helper data size to response bitstring size 1-to-1. This technique can be used in cases where the sum of the regions delineated by the margins is equal to the sum of the 'valid' regions defined for '0' and '1'.

Figure 10A:
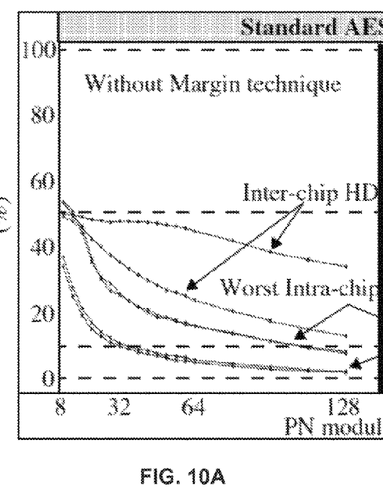
FIG. 10A is a graph illustrating hammering distance ("HD") results for the standard design without the margin technique according to an embodiment of the invention.
Figure 10B:
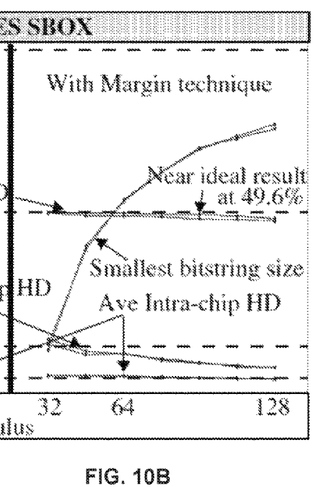
FIG. 10B is a graph illustrating hammering distance ("HD") results for the standard design with the margin technique according to an embodiment of the invention.

In order to determine trade-off of the two logic styles on randomness, uniqueness and reliability, inter-chip hammering distance ("HD") is evaluated. FIG. 10 presents the statistical results using data collected from the standard design SBOX. The analysis is carried out over a set of PN modulus (PNMod) values plotted along the x-axis. Inter-chip HD is computed by counting the number of bits that are different in the 2048-bit bitstrings produced by two chips during enrollment and then dividing by the number of bits. The values plotted are the average inter-chip HDs across all possible pairings of the bitstrings (30*29/2=435 pairings). Intra-chip HD is computed in a similar fashion except the pairings are defined using the bitstrings produced at the TV corners for each chip (10*9/2=45 pairings). The value plotted is again the average computed across the 30 individual chip values. Worst-case intra-chip HD is simply the maximum value produced by one of the individual chips. The curves for worst case and average case intra-chip HD in FIG. 10A reflect the noise levels, while the difference between the inter-chip and intra-chip HD curves reflect the range of usable entropy. Results are shown with and without with global variation.

The relatively large value of intra-chip HD (which is ideally 0%) is directly attributable to presence of glitching. Note that glitching can increase both intra-chip and inter-chip HD. For paths whose delays are affected by glitches consistently across all TV corners, the effect is beneficial because the path delay typically changes by 10 to 100 LCIs, and therefore represents a significant source of within-die variations. For those paths where the glitch is present at some TV corners and disappears at others, the effect is detrimental, resulting in bit flips. The worst-case intra-chip HD and inter-chip HD curves illustrate that both types occur. Although inter-chip HD increases, this benefit is partially offset by the increase in worst-case bit-flips. Average-case intra-chip HD, on the other hand, only increases slightly.

FIG. 10B shows the results after applying the margin technique. The margin technique significantly improves both the intra-chip and inter-chip HD results, as shown in FIG. 10B. A margin of 8 is used as the threshold to identify 'weak' bits in the response, however any margin number is contemplated. Inter-chip HD improves because the PNDiffs corresponding to the generation of the 'strong' bits in different chips can now vary. This is true because within-die variations cause PNDiffs for some chips to fall within the margins, while on others, those same PNDiffs are outside the margins. Another important characteristic is the lower sensitivity of the results to whether global variations are present or not, which is a highly desirable feature. The size of the smallest bitstring generated by one of the 30 chips is also plotted in FIG. 10B to illustrate the overhead associated with the helper data when the special 'complementary helper data' scheme described above is not used, to illustrate the overhead in this case. By selecting a PNMod that is >=64, the helper data bitstring is no larger than twice the size of the response bitstring in the worst case.

Figure 11A:
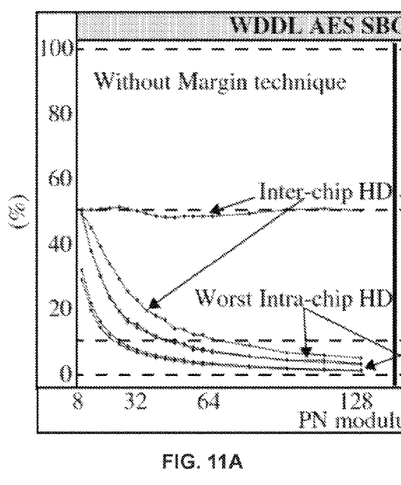
FIG. 11A is a graph illustrating hammering distance ("HD") results for the WDDL design without the margin technique according to an embodiment of the invention.
Figure 11B:
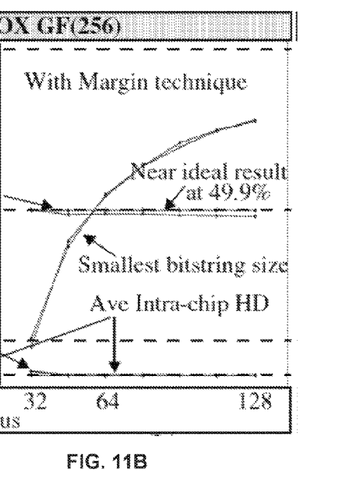
FIG. 11B is a graph illustrating hammering distance ("HD") results for the WDDL design with the margin technique according to an embodiment of the invention.

The results using the WDDL version are shown in FIG. 11. The longer paths present in the WDDL version are responsible for the improvement in the inter-chip HD to nearly ideal as shown on the left side in FIG. 11A. Thus, longer paths improve inter-chip HD but only in the case where global variations are preserved, i.e., the inter-chip HD curve without global variations shows a very different result. The results using the margin technique shown in FIG. 11B, on the other hand, are nearly ideal with or without global variations. The intra-chip HD curves also illustrate that the majority of the bit flips that remain in the corresponding results from FIG. 10B are attributable to the glitches produced in the "standard design", i.e., margining is not effective for glitches because the change in delay is larger than the worst case TV noise used as the margin. This is evident by the near 0 values for the worse case and average intra-chip HD for the WDDL version.

Given the benefits of a glitch-free functional unit, reducing overhead of implementing them is desirable. In particular, the invention includes a method to generate a complete set of truth tables for hazard-free functions for 2-input to 6-input gates using an efficient branch-and-bound algorithm, that can be used in WDDL-like implementations. The algorithm assumes a two phase logic style with a precharge phase and an evaluate phase as described above for WDDL logic—it should be noted that the algorithm can be adapted for other types of precharge and evaluate conditions. A selected subset(s) of the derived hazard-free functions can be used in CAD synthesis tools to both minimize the number of gates and to add diversity to functional implementations, as described below.

The algorithm uses an abstract representation of the Karnaugh map (K-map) of an n-input function as its data structure. A transition cube refers to a cube with start point A, end point B, and which contains all input combinations that can be reached during a transition from A to B. As is common for hazard-free circuit implementations, gate inputs are assumed to change at most once during the application of a 2-vector test to the primary inputs but can change in any order. A hazard-free implementation for a gate implementing function f transitions at most once on its output.

Figure 12:
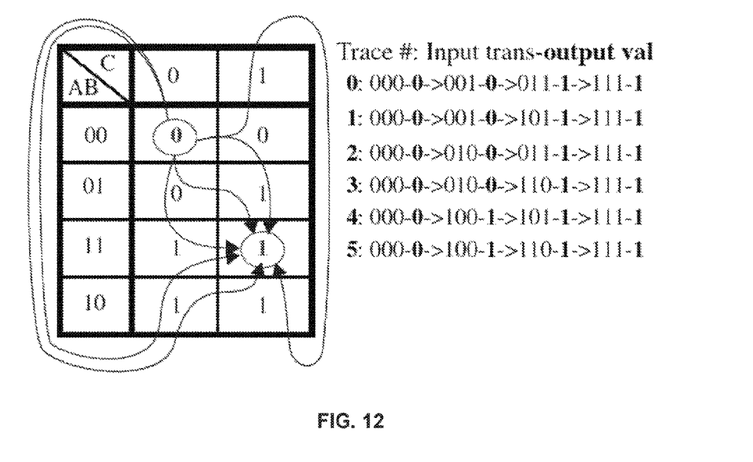
FIG. 12 is a Karnaugh map according to an embodiment of the invention.

The transitions associated with a WDDL style function have an additional constraint, requiring the start point in the Karnaugh map of the function to be f(000.0)=0 (which is enforced by the 'all 0' precharge condition) as illustrated for the 3-input function f=a+bc in FIG. 12. During evaluation, all of the paths that can be traversed in the K-map are highlighted with curves. The right side of FIG. 12 list these paths, in the format of 'gate input values-output value'. Note that even though the start point is (000)=0 and the end point is (111)=1, it is not required that all inputs change when this gate is sensitized in actual operation and therefore, the end point can be any point along the listed paths while still remaining hazard-free operation.

According to the invention, the algorithm that generates all functions that meet these constraints constructs K-map representations for gates up to 6 inputs (which matches the LUT input size on modern FPGAs). The traces listed on the right side of FIG. 12 are used as a template for the algorithm. For an n-input gate, the length of the traces is n+1, e.g., trace length is 4 for the 3-input gate of FIG. 12, and the number of traces is given by n! (factorial), which for 3-input gates is 6 but increases to 720 for 6-input gates. The output values shown on the right in the figure are also used by the algorithm to find valid K-maps. The out-put values listed from left-to-right in trace-order correspond to a thermometer code format, i.e., 0's followed by 1's, which ensures hazard-free operation of the constructed gate.

The number of possible K-maps for 6-input functions is $2^{64}$, so searching all possibilities for matches to hazard-free conditions is intractable. Instead, a branch-and-bound algorithm approach is developed to iteratively construct all hazard-free K-maps. The algorithm sequences through all possible traces and all possible thermometer code assignments for the traces. The number of possible thermometer code output assignments is given as n, e.g., as (0001, 0011, 0111) for a 3-input gate. From FIG. 12, only 2 of these thermometer code output values are actually used for the function f=a+bc, i.e., 0011 and 0111 but the 3rd is used in other valid hazard-free 3-input functions.

Although this increases the search space to $n^{n!}$, e.g., to $3^6$=729 for 3-input functions, the search process allows for very large portions of the search space to be eliminated (bounded), and makes the algorithm tractable for functions up to 6 inputs. A valid K-map is found when all n traces, each assigned a specific thermometer code for the output values, are consistent when the assignments are combined to define the K-map. Consistency refers to the requirement that output values in the K-map are assigned either a 0 or a 1 consistently by all traces. When the search process encounters a case where one trace assigns a 0 while another trace assigns a 1, this K-map fails as well as all subsequent K-maps that would have used this same 'inconsistent' assignment. This feature of the algorithm eliminates huge portions of the search space. For example, the number of elements searched for a 5-input gate of the possible $5^{5!}$=7.5e+83 is 1.8e+6 while the number of valid K-maps generated is 7,579. For the 6-input gate, the number of valid K-maps is several million.

Although many of the generated functions are ignored by synthesis tools because they are too complex, this is not the case for a subset of several hundred gates. As described below, including these gates in the library used for synthesis reduces the gate count of hazard-free implementations of the functional unit, e.g., using WDDL logic, and represents a direct benefit for synthesis to FPGAs. Moreover, the large diversity among the hazard-free functions that are generated by the disclosed algorithm also enables FPGA-oriented synthesis to create different 'versions' of the functional unit referred to as "functional diversity".

Figure 13:
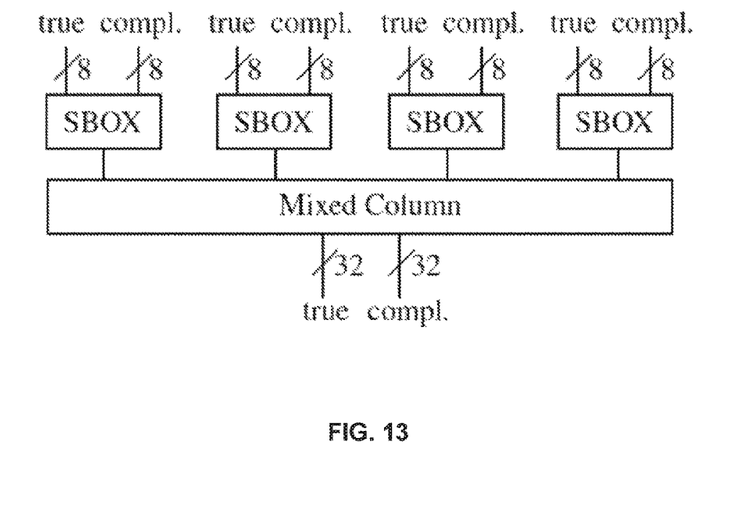
FIG. 13 illustrates the functional unit according to an embodiment of the invention.
Figure 14:
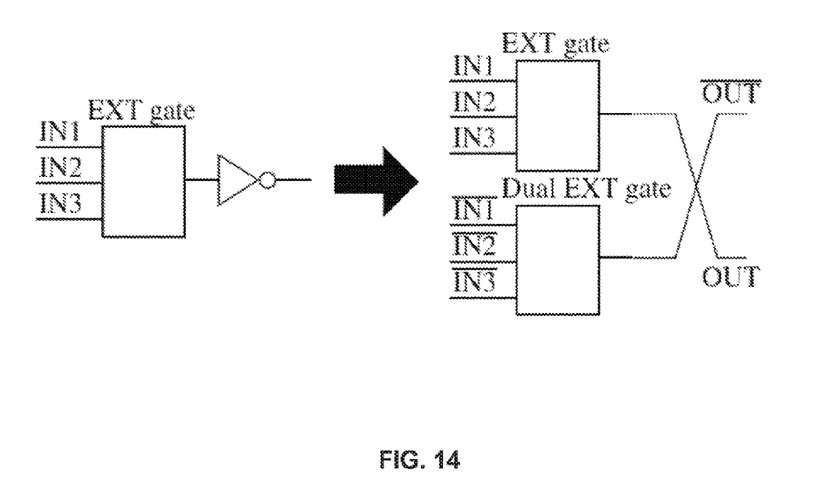
FIG. 14 illustrates a flow chart of a conversion process according to an embodiment of the invention.

The functional unit used in the analysis is shown in FIG. 13. As shown in FIG. 13, the functional unit includes SBOX as well as a mixed column component of a WDDL implementation (referred to herein as "MIXCOL"). A 90 element subset of the hazard-free functions generated using the algorithm described above is used to synthesize a single-ended structural netlist from the behavioral HDL description of MIXCOL. The 90 element subset was selected by using only the simplest versions of the generated EXT functions, in particular, only those functions which include a single instance of each input literal. A structural netlist is synthesized using 25 of the 90 cells available in the library. A perl script is used to convert the single-ended version into a WDDL version, by creating a complementary network and by eliminating the inverters. The conversion process is illustrated in FIG. 14, where an EXT gate with an inverted output is translated into the same EXT gate plus its dual (complementary) gate with outputs swapped as a means of eliminating the inverter.

The WDDL netlist is used as input to a synthesis and implementation tool, for example Vivado. Although the netlist is optimized, most of the optimization has already been performed by a compiler using the EXT library that was purposely constructed to match modern FPGA LUT characteristics. According to one embodiment, the total number of gates in the complier generated version is 3,096, while the Vivado generated version contained 2,891 LUTs. The LUT based netlist generated by Vivado is used in the analysis described below.

Hazard-free transitions are generated in the MIXCOL functional unit of FIG. 13 by applying a 2-vector sequence to the 32 true and complementary inputs using precharge-evaluate constraints. For example, a 64-bit WDDL vector pair can be represented in the form (00 . . . 0/00 . . . 0, xx . . . x/xx . . . x) which shows all 0's being applied to both true and complementary inputs during precharge followed by the application of an arbitrary vector from the set 232 and its complement during evaluate.

Delay variations that occur within and across the individual gates and wires of the functional unit are the underlying source of entropy for the HELP PUF. The HELP PUF leverages entropy in path delays, which combines variations from gate and wire delays in unique ways. According to the invention, the paths in the functional unit are not systematically combined in a predictable manner, but rather are defined as complex interconnection networks that vary in length, can exhibit glitching and which are very large in number and can be difficult to sensitize. The undesirable bias introduced by paths of different lengths can be reduced or eliminated by using a modulus technique, while glitch-free logic styles such as WDDL can be used to eliminate the undesirable glitching.

One of the primary benefits of using a functional unit as the source of entropy is based on the large number of paths it provides and the difficulty of generating vectors to sensitize them. The large number of paths provides a benefit for applications such as authentication, particularly when the primary threat mechanism is model-building.

As shown in FIG. 13, the WDDL version of MIXCOL has 64 primary inputs and 64 primary outputs. The original compiler-generated single-ended version of the netlist (before conversion to WDDL) has 652 inverters and 1,548 logic gates. The conversion to WDDL creates interconnectors between the true and complementary networks whenever inverters are processed (and eliminated). The large number of inverters indicates that the two networks are interconnected in many places. The total number of structural paths in MIXCOL is 1,732,085. Considering MIXCOL represents less than ¼th of the entire functional unit indicates that the total number of paths likely exceeds more than 10 million in the full version of the functional unit. Therefore, the structural netlist of MIXCOL provides a very large source of entropy.

The WDDL netlist in combination with precharge-evaluate constraints guarantee that glitch-free operation of the functional unit. The total number of WDDL vectors that can be applied under these constraints is $2^{33}$, which accounts for both rising and falling transitions. The complementary network ensures that exactly 32 primary outputs (of the 64) transition under each vector sequence, yielding a total of $2^{38}$ rising and falling transitions. Each transition corresponds to the testing of a path. As indicated, there are only 1.7 million paths, if all paths are tested by the WDDL vector, then each path is tested on average approximately $2^{38}/2^{20}=2^{18}$ times across all vectors.

A special form for simulation and signal propagation analysis is required to determine the actual number of paths tested by WDDL vectors. The interconnection structure of the netlist allows for multiple signals reconverging at gate inputs along any particular path to determine the timing of a signal transition at a primary out-put. For example, the last arriving 0->1 transition on the input to an AND gate controls the output 0->1 transition on that gate. Analogously, for OR gates, the opposite condition holds where the path segment driving the first 0->1 transition controls the 0->1 output transition. The input/segment that dominates the timing refers to the path input and corresponding path segment that controls the output transition. Therefore, the path that is actually tested consists of those path segments along the path that dominate the timing, and the transitions associated with all other path segments are masked. The path segments that are masked do not participate in the entropy associated with the tested path and are not counted.

Figure 15:
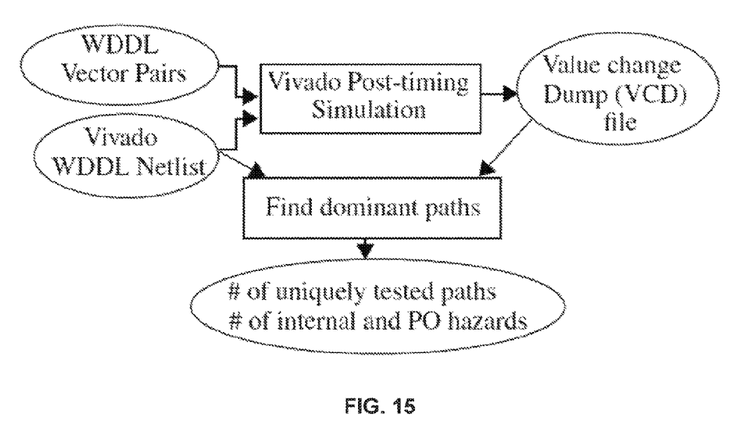
FIG. 15 illustrates a flow chart of an entropy analysis according to an embodiment of the invention.

FIG. 15 illustrates a flow chart of an entropy analysis according to an embodiment of the invention. According to the analysis, paths that dominate the timing to each of the primary outputs is enumerated. The program uses the structural netlist and the simulation data generated as 2-vector sequences are applied to the primary inputs. The simulation data is saved in a file (e.g., a 'value-change-dump' file), which provides a compressed representation of the timestamps and signal transitions that occur on every node of the circuit under the test sequence(s).

The program reports the number of uniquely sensitized paths that dominate the timing for the test vector sequence captured in the VCD file. It also reports the number of static and dynamic hazards that occur on the primary outputs (POs) as well as those that occur on internal nodes (many hazards are not observable on POs). The timings of the signal transitions in the VCD file represent the worst-case process, temperature and supply voltage conditions. More importantly, Vivado does not provide any timing distributions or modeling within-die variations. Therefore, the reported results are conservative because within-die variations may allow other path segments to dominant the timing. In order to better approximate the actual hardware, a tolerance parameter is available to find dominate paths that enables reporting of additional path segments for each PO output transition. Although only one of each of the possible path segments dominates the timing in each chip (unless two or more segments have equal delay values), the list of paths produced for each PO transition, and, more importantly, the total number of unique paths reported for a given tolerance, better reflects the behavior of the hardware.

As indicated above, there are $2^{33}$ WDDL vectors (rising and falling), which is far too large to process using the tool flow chart shown in FIG. 15. Instead, small subsets of these WDDL vectors are processed and used the results to predict the path coverage for all 8.6 billion vectors. The coverages provided by vector subsets of size 1, 500, 1000, 2000, 4000 and 8000 are curve-fit using an exponential. The predicted coverage of the WDDL vectors is approximately 20% of the 1.7+ million structural paths.

The number of paths that are actually hazard-free testable are determined using any type of 2-vector sequence. In order to make the problem tractable, subsets from the 1.7+ million paths are created and used as input to an encounter test ("ET"). The ET can generate hazard-free tests for nearly half of the paths in the subsets which suggests that approximately 30% more entropy may be leveraged from the functional unit. Moreover, the difficulty of generating the vectors to test all paths, in combination with the huge number of paths available, makes it difficult or impossible for an adversary to systematically apply test patterns to a hardware token as a means of carrying out a model-building attack.

Figure 16:
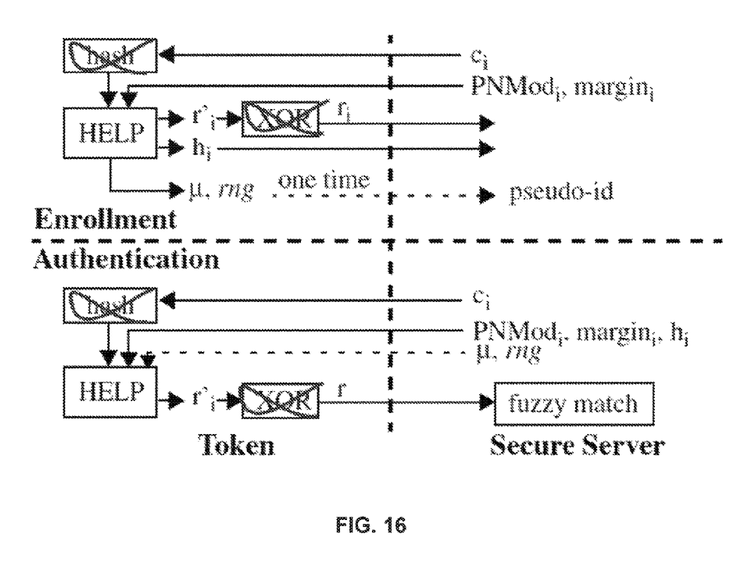
FIG. 16 is a block diagram of an authentication protocol according to an embodiment of the invention.

One possible authentication protocol is shown in FIG. 16. During enrollment, the server generates random challenges, $c_i$, $PNMod_i$ and $margin_i$ which are used as input by the hardware token. The HELP PUF produces response $r_i$ and helper data $h_i$, which are stored on the server with the challenge information. In cases where global variations are utilized, a $\mu$ and rng are also computed for the chip and stored on the server (note these values can also be used as a pseudo-id for the chip). In many proposed authentication protocols, the challenge is typically passed through a cryptographic hash function to increase the difficulty of model building attacks which attempt to systematically learn the response characteristics of the PUF.

The hash makes it difficult to determine how to choose $c_i$ such that the output of the hash is controlled to specific PUF input values. Similarly, an XOR obfuscation function of the response can be added to obfuscate the responses. These obfuscation functions are 'x'ed out because model building HELP is very difficult even with direct access to its inputs and outputs. Therefore, the authentication protocol according to the invention using HELP has unprotected interfaces. The elimination of heavy-weight cryptographic hashes and XOR networks reduces the area and energy overhead on the hardware token.

Authentication is carried out in a similar fashion except for the direction of transmission of the helper data, $h_i$, $\mu$ and rng. It should be noted that and rng are not needed if the PNDiffs are TV compensated to a universal standard (which also eliminates entropy from global variations). Also, helper data processing may be done on the server side (no need to transmit it to the token) to save energy on the resource-constrained token. Last, 'fuzzy matching' may not necessary in cases where the token is able to carry out bitstring regeneration with no bit flip errors.

As indicated earlier, the margin and PNMod parameters improve the security properties of the HELP PUF because they expand the challenge-response space. However, allowing this parameter to be set without constraints can be used by an adversary to assist with model building. The invention suggests that a hard coded margin or allowing only a small range of values, e.g., between 5 and 8, accomplishes the goal of improving the statistics while maintaining a limited information leakage channel. The same is true of the PNMod parameter, where only a limited set of values should be allowed, e.g., restricting to powers of 2 also significantly simplifies the implementation of the modulus operation while providing a 'limited' expansion of the CRP space.

While the invention and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the invention, which is to be limited not by the exemplary embodiments but by the appended claims.

The invention claimed is:

1. A reliability enhancement method to reduce the number of bit flips during physically unclonable function bitstring generation comprising the step of:
   measuring a path delay value of each launch capture interval of a plurality of intervals;
   calculating a difference value between two randomly selected path delay values;
   defining the difference value as a '0' bit when the difference value is positive and a '1' bit when the difference value is negative;
   generating a family of bitstrings based on the defining step, each bitstring generated at two or more supply voltage regulators; and
   eliminating the family of bitstrings by identifying inconsistencies in one or more bit positions of each bitstring generated at the two or more supply voltage regulators.

2. The reliability enhancement method to reduce the number of bit flips during physically unclonable function bitstring generation according to claim 1, wherein the defining step further comprises the steps of:
   deriving a threshold value based on temperature-voltage conditions; and
   defining the difference value as 'invalid' when the difference value is greater than the threshold value.

3. The reliability enhancement method to reduce the number of bit flips during physically unclonable function bitstring generation according to claim 1 further comprising the steps of:
   defining a jump margin parameter; and
   disregarding the path delay value and the difference value when either of the path delay value or the difference value are less than the jump margin parameter.

4. The reliability enhancement method to reduce the number of bit flips during physically unclonable function bitstring generation according to claim 1, wherein each supply voltage regulator operates at the voltage of 0.95V, 1.00V, 1.05V.

5. The reliability enhancement method to reduce the number of bit flips during physically unclonable function bitstring generation according to claim 1 further comprising the step of computing a mean and a range from a set of difference values to compensate for variation in temperature and voltage.

6. The reliability enhancement method to reduce the number of bit flips during physically unclonable function bitstring generation according to claim 1 further comprising the step of applying a modulus to the difference values to remove the path length bias.

7. The reliability enhancement method to reduce the number of bit flips during physically unclonable function bitstring generation according to claim 1 further comprising the step of identifying the difference values that have a highest probability of introducing bit flips.

8. The reliability enhancement method to reduce the number of bit flips during physically unclonable function bitstring generation according to claim 7, wherein the highest probability of introducing bit flips occurs at a boundary between the '0' bit and the '1' bit.

9. The reliability enhancement method to reduce the number of bit flips during physically unclonable function bitstring generation according to claim 1, wherein the method uses a glitch-free implementation of a functional unit.

10. An enrollment method for bitstring generation by an integrated circuit, comprising the step of:
   (a) measuring a plurality of launch-capture interval path timing values for a physically unclonable function;
   (b) selecting randomly two path timing values of the physically unclonable function;
   (c) calculating a difference value between the two path timing values;
   (d) assigning a '0' bit when the difference value is positive and a '1' bit when the difference value is negative;
   (e) performing steps (a)-(d) at two or more supply voltage regulators to obtain two or more bitstrings; and
   (f) identifying inconsistencies in the two or more bit strings; and (g) removing the inconsistent bitstrings to reduce the number of bit flips.

11. The enrollment method for bitstring generation by an integrated circuit according to claim 10, wherein the assigning step further comprises the steps of:
deriving a threshold value based on temperature-voltage conditions; and
defining the difference value as 'invalid' when the difference value is greater than the threshold value.

12. The enrollment method for bitstring generation by an integrated circuit according to claim 10 further comprising the steps of:
defining a jump margin parameter; and
disregarding any path timing values and difference values when the path timing value or the difference value is less than the jump margin parameter.

13. The enrollment method for bitstring generation by an integrated circuit according to claim 10, wherein each supply voltage regulator operates at the voltage of 0.95V, 1.00V, 1.05V.

14. The enrollment method for bitstring generation by an integrated circuit according to claim 10 further comprising the step of computing inter-chip hamming distance.

15. The enrollment method for bitstring generation by an integrated circuit according to claim 14, wherein the computing step further comprises the step of counting a number of bits that are different in the bitstrings produced by two integrated circuits.

16. The enrollment method for bitstring generation by an integrated circuit according to claim 10 further comprising the step of computing intra-chip hamming distance.

17. The enrollment method for bitstring generation by an integrated circuit according to claim 16, wherein the computing step further comprises the step of counting a number of bits that are different in the bitstrings produced at two TV corners, each TV corner from different integrated circuits.

18. The enrollment method for bitstring generation by an integrated circuit according to claim 10 further comprising the step of computing a mean and a range from a set of difference values to compensate for variation in temperature and voltage.

19. The enrollment method for bitstring generation by an integrated circuit according to claim 10 further comprising the step of applying a modulus to the difference values to remove the path length bias.

20. The enrollment method for bitstring generation by an integrated circuit according to claim 10 further comprising the step of identifying the difference values that have a highest probability of introducing bit flips.

21. The enrolment method to reduce the number of bit flips during physically unclonable function bitstring generation according to claim 20, wherein the highest probability of introducing bit flips occurs at a boundary between the '0' bit and the T bit.

22. The enrollment method for bitstring generation by an integrated circuit according to claim 10, wherein the method uses a glitch-free implementation of a functional unit.

* * * * *